US007299056B2

(12) United States Patent
Anderson

(10) Patent No.: US 7,299,056 B2
(45) Date of Patent: *Nov. 20, 2007

(54) VEHICULAR NAVIGATION BASED ON SITE SPECIFIC SENSOR QUALITY DATA

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 156 days.

This patent is subject to a terminal disclaimer.

(21) Appl. No.: 11/093,502

(22) Filed: Mar. 30, 2005

(65) Prior Publication Data

US 2006/0189324 A1 Aug. 24, 2006

Related U.S. Application Data

(60) Provisional application No. 60/655,544, filed on Feb. 23, 2005.

(51) Int. Cl.
*H04Q 7/20* (2006.01)
*G01C 21/16* (2006.01)

(52) U.S. Cl. ............... 455/456.1; 701/201; 701/217

(58) Field of Classification Search ............ 455/411, 455/456.1; 701/25, 28, 201; 700/245
See application file for complete search history.

(56) References Cited

U.S. PATENT DOCUMENTS

| | | | |
|---|---|---|---|
| 4,727,492 A | 2/1988 | Reeve et al. | |
| 5,111,401 A | 5/1992 | Everett, Jr. et al. | |
| 5,367,458 A * | 11/1994 | Roberts et al. | 701/25 |
| 5,777,580 A | 7/1998 | Janky et al. | |
| 5,974,348 A * | 10/1999 | Rocks | 701/28 |
| 2004/0158355 A1* | 8/2004 | Holmqvist et al. | 700/245 |
| 2006/0149425 A1 | 7/2006 | Allen | |

OTHER PUBLICATIONS

Geoffrey Blewitt and George Taylor, *Mapping Dilution of Precision (MDOP) and map-matched GPS*; International Journal Geographical Information Science, 2002 vol. 16, No. 1 55-67.

* cited by examiner

*Primary Examiner*—Joseph Feild
*Assistant Examiner*—Kiet Doan

(57) ABSTRACT

A method and system for determining a location of a vehicle, the method comprises determining reception location data within a first cell of a work area for a vehicle. A reception quality estimator estimates reception quality data for the corresponding reception location data for the first cell. Optical location data is determined within a first cell of a work area for a vehicle. An optical quality estimator estimates optical quality data for the corresponding optical location data for the first cell. A data processor selects at least one of the reception location data and the optical location data as refined location data associated with the first cell based on the estimated reception quality data and estimated optical quality data.

16 Claims, 11 Drawing Sheets

Error Magnitude Contour in Work Area

Error Magnitude Contour in Work Area

Error Magnitude Contour in Work Area

US 7,299,056 B2

VEHICULAR NAVIGATION BASED ON SITE SPECIFIC SENSOR QUALITY DATA

This document claims priority based on U.S. provisional application Ser. No. 60/655,544, filed Feb. 23, 2005, and entitled VEHICULAR NAVIGATION BASED ON SITE SPECIFIC SENSOR QUALITY DATA under 35 U.S.C. 119(e).

FIELD OF THE INVENTION

This invention relates to vehicular navigation based on site specific sensor quality data.

BACKGROUND OF THE INVENTION

Location sensing devices include odometers, Global Positioning Systems (GPS), and vision-based triangulation systems, for example. Many location sensing devices are subject to errors (e.g., measurement error) in providing an accurate location estimate over time and different geographic positions. The error in the location estimate may vary with the type of location sensing device. Odometers are subject to material errors from slipping or sliding over a surface terrain. For example, wheel or tire slippage may cause the odometer to estimate an erroneous location for a corresponding vehicle. A Global Positioning System (GPS) may suffer from errors or lack of availability because one or more satellite transmissions are attenuated or reflected by buildings, trees, hills, terrain or other obstructions. Vision based triangulation systems may experience error over certain angular ranges and distance ranges because of the relative position of cameras and landmarks. Thus, there is a need to improve the accuracy and the availability of location sensing devices for a vehicle to facilitate accurate navigation of the vehicle within a work area.

SUMMARY OF THE INVENTION

In accordance with one embodiment, a method and system for determining a location of a vehicle, reception location data is determined within a first cell of a work area for a vehicle. A reception quality estimator estimates reception quality data for the corresponding reception location data for the first cell. Optical location data is determined within a first cell of a work area for a vehicle. An optical quality estimator estimates optical quality data for the corresponding optical location data for the first cell. A data processor selects at least one of the reception location data, the optical location data, and other location data as refined location data associated with the first cell based on the estimated reception quality data and estimated optical quality data.

DESCRIPTION OF THE PREFERRED EMBODIMENT

Figure 1:
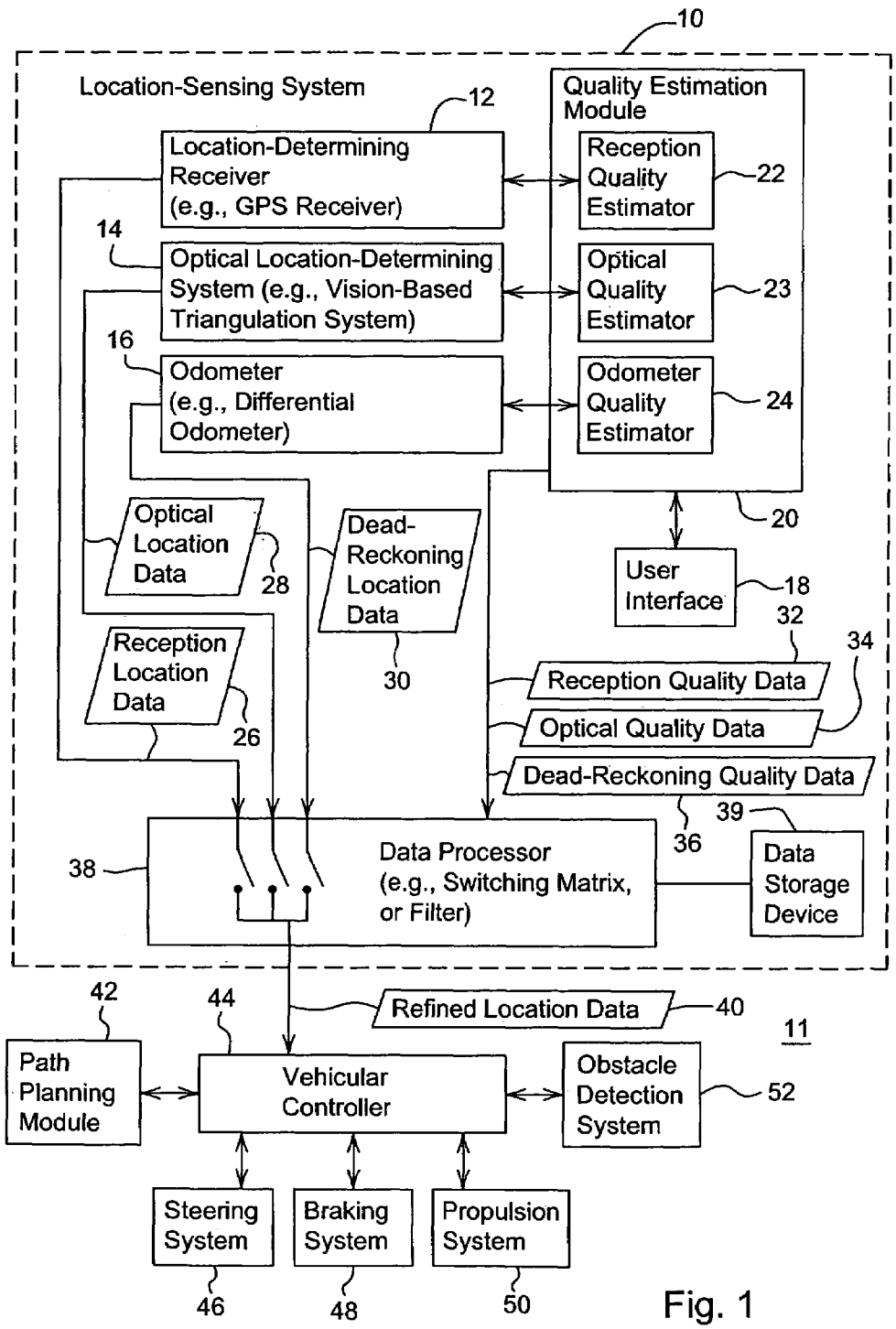
FIG. 1 is a block diagram of a system for determining a location of a vehicle based on site specific sensor quality data.

In accordance with one embodiment, FIG. 1 shows a system 11 for determining a location of a vehicle based on site specific sensor quality data. The system 11 comprises a location-sensing system 10 coupled to a vehicular controller 44. A path planning module 42 may provide a path plan or other navigation-related input data to the vehicular controller 44. The obstacle detection system 52 may provide navigation-related input on stationary or moving objects within a work area (e.g., to avoid collisions with such objects). In turn, the vehicular controller 44 may communicate with (e.g., issue control data or signals to) one or more of the following: a steering system 46, a braking system 48, and a propulsion system 50.

In one embodiment, the location sensing system 10 comprises a location-determining receiver 12, an optical location determining system 14, and a dead-reckoning system 16 that are coupled to a quality estimation module 20. The location determining receiver 12, the optical location determining system 14, and the dead-reckoning system 16 may be collectively referred to as location sensors. Any of the location sensors may be referred to individually as a location sensor.

The location determining receiver 12 may comprise a Global Positioning System (GPS) receiver with differential correction, or another receiver for receiving electromagnetic energy from transmitters (e.g., terrestrial or satellite beacons) to determine a location (e.g., in two dimensional or three dimensional coordinates) of the vehicle. The location-determining receiver 12 (e.g., GPS receiver) communicates to a reception quality estimator 22; the optical location-determining receiver 12 (e.g., vision-based triangulation system) communicates to an optical quality estimator 23; and the dead-reckoning system 16 (e.g., differential odometer) communicates with a dead-reckoning quality estimator 24. The location-determining receiver 12 outputs reception location data 26. Reception location data may also be referred to as primary location data, whereas all other location data from location sensors (e.g., of the location-sensing system 10) may be referred to as secondary location data (e.g., optical location data, odometer location data, radio frequency ranging location data, gyro location data, magnetometer location data, and accelerometer location data).

The optical location-determining system 14 outputs optical location data 28. The optical location-determining system 14 may comprise a laser system, a scanning laser system, a ladar (e.g. laser radar) system, a laser range finder, a stereo vision system, a monocular vision system, a machine vision system, or the like. The optical location-determining system may operate over the humanly visible light spectrum, infra-red, near-infra-red or ultraviolet light spectrum, for example.

In an alternate embodiment, the optical location-determining system 14 may be replaced by a terrestrial or local radio frequency (RF) ranging system that estimates the location of a vehicle by measuring the time of arrival, the angle of arrival or both of a radio frequency signal transmitted from one or more fixed or known locations within a maximum radius of the work area. Accordingly, if the optical location determining system 14 is replaced by a local radio frequency ranging system, the optical location data is replaced with radio frequency (RF) location data.

In general, the dead-reckoning system 16 comprises a displacement sensor and a heading sensor. The displacement sensor measures the relative displacement of the vehicle, whereas the heading sensor measures the relative heading. The dead-reckoning system 16 outputs dead-reckoning location data 30. The dead-reckoning location data may provide a traveled distance of the vehicle, a traveled direction of the vehicle, traveled distance versus time (e.g., vehicular speed), or vehicular velocity (e.g., speed and heading).

In one embodiment, the dead-reckoning system 16 comprises an odometer as the displacement sensor and a gyroscope (e.g., a fiberoptic gyroscope) as the heading sensor. The odometer may directly or indirectly count wheel revolutions or fractions thereof, of one or more wheels associated with the vehicle. The gyroscope may provide vehicle direction information or heading information.

In alternate embodiments the dead-reckoning system 16 may comprise one or more of the following: a wheel revolution counter, an integrator associated with a speed sensor, an integrator associated with a radar system, a gyro, a fiberoptic gyroscope, a vibration gyroscope, a magnetometer, and an accelerometer. The output of an accelerometer may be double-integrated to determine displacement, for example.

The optical location-determining system 14 may comprise a plurality of cameras mounted around a perimeter of the work area or inside the work area to determine vehicle location from stereo vision information, for example. If the cameras are mounted on or near a perimeter of the work area, rather than on the vehicle itself, the optical location-determining system 14 may be considered an "outside-looking-in" system.

The dead-reckoning location data 30 may comprise a covered distance and a corresponding heading of the vehicle. In one embodiment, the dead-reckoning system 16 may use an optical or magnetic source coupled to a rotational member (e.g., a wheel, or shaft in the drive train) that emits an optical signal or magnetic field, which is sensed by a sensor to determine the amount of revolutions or fractional revolutions of a wheel of the vehicle. The revolutions of the wheel may be converted into estimated distance. In other embodiments, an odometer or other component of the dead-reckoning system may be mechanically coupled to a rotational member of a drive train or a wheel. Because the dead-reckoning error (e.g., approximately equal to ten (10) percent) of the dead-reckoning system 16 may be greater than that of radar system (e.g., typical error less than three percent) or a location-determining receiver, the dead-reckoning system 16 may be supplemented with readings from a radar system, a location-determining receiver, and an accelerometer to estimate velocity of the vehicle, position of the vehicle, or both.

The quality estimation module 20 outputs one or more of the following quality data to a data processor 38: reception quality data 32, optical quality data 34, and dead-reckoning quality data 36. The reception quality data 32 may vary with the vehicle location of the vehicle in the work area. The optical quality data 34 may vary with the vehicle location of the vehicle in the work area. The dead-reckoning quality data 36 (e.g., odometer quality data and gyroscope quality data) may vary with the vehicle location of the vehicle in the work area. The reception quality estimator 22 estimates or determines reception quality data 32 (e.g., Dilution of Precision (DOP) data); the optical quality estimator 23 estimates or determines optical quality data 34 (e.g., Dilution of Precision or a figure of merit for the reported position based on at least one of technical specifications of a vision sensor of the optical location determining system 14, an observed scene for the first cell, and an imaging processing algorithm for the optical location data.); and the odometer quality estimator 24 estimates or determines dead-reckoning quality data 36.

To create site specific error data for each location sensor, the location sensors may take a number of samples of reception location data 26, optical location data 28, and dead-reckoning location data 30 for known or verifiable locations within the work area (e.g., within all cells of a work area and for each location sensor). Error levels, availability, or reliability levels (e.g. in percentage terms) may be determined for respective coordinates within the work area by comparing the measured location of each location sensor to the known or verifiable location. The error level data, availability data or reliability data may be expressed as quality data. For example, the reception quality data 32 may comprise Dilution of Precision (DOP). The quality estimation module 20 may facilitate the storage of site-specific error data for each location sensor (e.g., location determining receiver 12, optical location-determining system 14, and dead-reckoning system 16) for the vehicle in the data storage device 39.

Dilution of Precision (DOP) is an indicator of the quality of a position data (e.g., GPS position data) which considers the relative locations of satellites and their geometric relationship to the location determining receiver. For example the DOP may consider the number of satellites that are available (e.g., capable of being received with a reliable signal strength, a signal quality level, a maximum bit or symbol error rate) to a location determining receiver from particular geographic coordinates of the location determining receiver at a given time. In accordance with one embodiment, a low DOP value indicates a higher probability of accuracy. A DOP may comprise any of the following: Position Dilution of Precision, Relative Dilution of Precision, Horizontal Dilution of Precision, Vertical Dilution of Precision, Time Dilution of Precision, and Geometric Dilution of Precision. Position Dilution of Precision refers to a DOP value for the particular three dimensional location or coordinates of the location determining receiver, which is a unit-less figure of merit expressing the relationship between error in the location determining receiver position and error in satellite position. Relative Dilution of Precision provides an indication of the adequacy of observations of a location determining receiver during real-time surveying of measurements. Horizontal Dilution of Precision refers to DOP with respect to latitude and longitude measurements. Vertical dilution of precision refers to DOP with respect to height. Time Dilution of Precision refers to DOP with respect to variations over time.

A user interface 18 may comprise a keyboard, keypad, a display, a pointing device (e.g., mouse, trackball), a magnetic disc drive, a magnetic tape drive, an optical disc, a data port (e.g., parallel, serial or a Universal Serial Bus (USB) port), or another mechanism for inputting or entering input data. A user interface 18 may support the input or entry of data that is used to assess the quality of the reception location data 26, the optical location data 28, and the dead-reckoning location data 30. A user interface 18 may support the entry of true or precision coordinates, location, or bearing of the vehicle from ancillary equipment, such as survey equipment, optical surveying equipment, laser surveying equipment, or otherwise to calibrate, ground-reference or estimate error level (and to facilitate respective quality data estimates) for the output of the location-determining receiver 12, the optical location-determining system 14, and the dead-reckoning system 16.

The data processor 38 may receive or obtain reception location data 26 from the location-determining receiver 12, optical location data 28 from the optical location-determining system 14, and dead-reckoning location data 30 from the dead-reckoning system 16. The reception location data 26 is associated with corresponding reception quality data 32; the optical location data 28 is associated with corresponding optical quality data 34; and the dead-reckoning location data 30 is associated with corresponding dead-reckoning quality data 36. The data processor 38 may be used to implement or control a switching matrix, or a filter such that an output comprises refined location data 40.

In a first example, the data processor 38 selects a preferential one of the reception location data 26, optical location data 28, and dead-reckoning location data 30 for corresponding distinct locations or zones within the work area. For example, the work area may be divided into a first set of zones where reception location data 26 is used to guide the vehicle or plan a path plan for the vehicle; a second set of zones where the optical location data 28 is used to guide the vehicle or plan a path plan for the vehicle; and a third set of zones where the dead-reckoning location data 30 is used to guide the vehicle or plan a path plan for the vehicle. The refined location data 40 may represent selection of the most reliable or accurate data for a corresponding zone when a vehicle is in such a zone.

In a second example, the data processor 38 selects a preferential one of the reception location data 26, optical location data 28, and dead-reckoning location data 30 for corresponding distinct locations or cells within the work area. For example, the work area may be divided into a first set of cells where reception location data 26 is used to guide the vehicle or plan a path plan for the vehicle; a second set of cells where the optical location data 28 is used to guide the vehicle or plan a path plan for the vehicle; and a third set of cells where the dead-reckoning location data 30 is used to guide the vehicle or plan a path plan for the vehicle. The refined location data 40 may represent selection of the most reliable or accurate data for a corresponding zone when a vehicle is in such a zone. The member of the first set of cells may be contiguous or noncontiguous. The member of the second set of cells may be contiguous or noncontiguous. The member of third set of cells may be contiguous or noncontiguous.

In a third example, the data processor 38 may facilitate the application of a first weight to reception location data 26 based on the reception quality data 32 for a particular vehicle location, a second weight to optical location data 28 based on the optical quality data 34 for a particular vehicle location, and a third weight to dead-reckoning location data 30 based on the dead-reckoning quality data 36. Accordingly, a priori site-specific localization sensor information can be used to weight or select individual location sensors (alone or in combination) to be used for a position fix or determination of the vehicle.

The data processor 38 is coupled to a data storage device 39 for storing a prior site specific location sensor data, refined location data, cellular definition data (e.g., for a first cell), zone definition data (e.g., for a first zone, a second zone, and third zone), reception quality data versus cellular location, reception quality data versus zone data, optical quality data versus cellular location, optical quality data versus zone data, dead-reckoning quality data 36 versus cellular location, and dead-reckoning quality data 36 versus zone data, preferential location data type (e.g., reception location data, optical location data, and odometer location data) versus cellular location, preferential location data type versus zone, and cellular locations versus a first indicator of reception location data (as preferential location data or refined location data for a cell), and cellular locations versus a second indicator of optical location data (as preferential location data or refined location data for a cell). The first indicator (e.g., number or symbol) is distinct from the second indicator. The data storage device 39 may store any of the foregoing data as a matrix, a look-up table, a database, a relational database, tabular data entries, a file or as another data structure. Further, the matrix may comprise a multi-dimensional matrix that varies with time, because the reliability of the reception location data or other location data may vary with time (e.g., as different constellations and numbers of satellites are available at a particular geographic coordinates.) The data storage device 39 may comprise memory, a register, an optical disk drive, a magnetic disk drive, a magnetic storage device, an optical storage device, or the like.

The vehicle controller may generate control signals for the steering system 46, a braking system 48 (if present), and a propulsion system 50 that are consistent with tracking a path plan, provided by the path planning module 42. For example, the control signals may comprise a steering control signal or data message that is time dependent and defines a steering angle of the steering shaft; a braking control signal or data message that defines the amount of deceleration, hydraulic pressure, or braking friction applied to brakes; a propulsion control signal or data message that controls a throttle setting, a fuel flow, a fuel injection system, vehicular speed or vehicular acceleration. If the vehicle is propelled by an electric drive or motor, the propulsion control signal or data message may control electrical energy, electrical current, or electrical voltage to the electric drive or motor.

The steering system 46 may comprise an electrically controlled hydraulic steering system 46, an electrically driven rack-and-pinion steering, an Ackerman steering system 46, or another steering system 46. The braking system 48 may comprise an electrically controlled hydraulic braking system 48, or another electrically controlled friction braking system 48. The propulsion system 50 may comprise an internal combustion engine, an internal combustion engine- electric hybrid system, an electric drive system, or the like.

The path planner 42 may use a priori information to limit the maximum errors from the location-sensing system 10 that might otherwise accumulate. Error from the dead-reckoning system 16 and/or a gyroscope might tend to accumulate without reference data fro application to an error detection and correction algorithm. The path planner 42 may also use maximum calculated errors to adjust overlap from pass to pass or within a pass. The path planner 42 may use camera pan, tilt, zoom rate limits of a an optical location-determining system 14 to construct paths to avoid the vehicle exceeding those limits.

Figure 2:
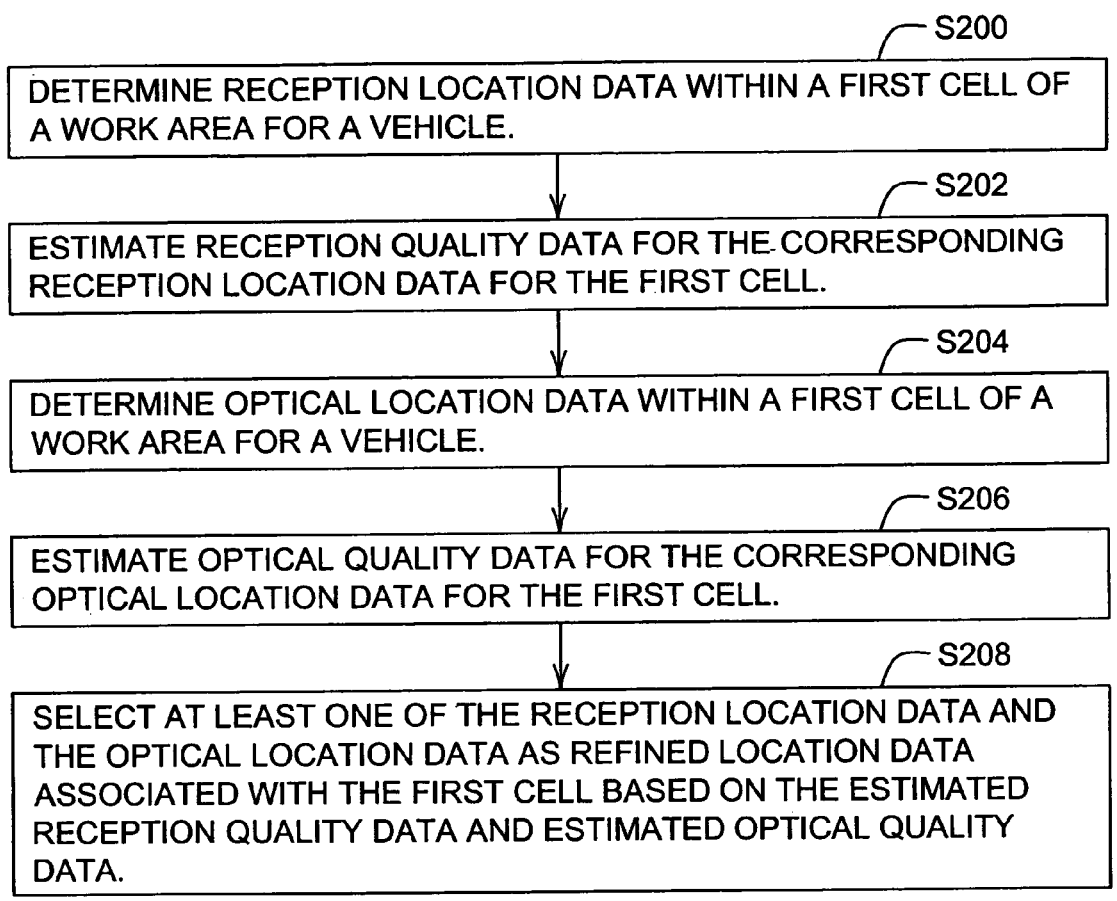
FIG. 2 is a flow chart of a first method for determining a location of a vehicle based site specific sensor quality data.

FIG. 2 discloses a method for determining a location of a vehicle based on site specific sensor quality data. The method of FIG. 2 begins in step S200.

In step S200, a location-sensing system 10 or location-determining receiver 12 determines reception location data 26 within a first cell of a work area for a vehicle. The work area may be divided into a number of cells. The first cell is any cell within the work area where the vehicle is located. The cell may be defined by its boundaries or its center point, for example. Although the exact coordinates of the vehicle may not be known because of potential error in the location sensors, under one illustrative technique for executing step S200, the size of the first cell may be selected to be sufficient to contain the vehicle with allowance for the potential error at least for a certain reliability level.

In step S202, a quality estimation module 20 or reception quality estimator 22 estimates reception quality data for the corresponding reception location data 26 for the first cell. The work area may be divided into a group of cells or coordinate ranges, where each cell or coordinate range is associated with a respective reliability, availability and/or error of localization of the location determining receiver 12 or the reception location data 26. Where the work area is divided into such cells or coordinate ranges, the quality estimator 20 or reception quality estimator 22 may retrieve or access reception quality data 32 for a corresponding first cell.

In one embodiment, the estimated reception data 32 of step S202 is based on satellite position forecasts for the work site for the particular time of operation of the vehicle in the work area. For example, the reception quality data may be related to the relative orbital positions or spatial coordinates of the satellites used in the position solution. Further, the greater the number of satellites that can be used in the solution or that are available for reception by the location determining receiver a particular geographic coordinates at a particular time, the more accurate the solution will generally be. A satellite is available for reception if the location determining receiver at particular geographic coordinates at a particular time can receive and decode the satellite's transmission with sufficient reliability, which may depend upon received signal strength, received signal quality, received bit error rate, received symbol error rate, demodulation techniques, decoding techniques for the pseudo-random noise code, or other technical constraints. Obstructions (e.g., stadium walls and protective roofs) may impact the number of satellites used in a solution or the reliability of the one or more received satellite signals. The reception quality data may be expressed as a dilution of precision (DOP), or a subclass or variant thereof. The dilution of precision can be calculated by location within the worksite (e.g., by using satellite position forecasts for the time the stadium will be mowed) or measured empirically with a location-determining receiver 12 (e.g., GPS receiver) that reports DOP recorded at various positions within the work area or site over a period of time.

In step S204, an optical location-determining system 14 determines optical location data 28 within a first cell of a work area for a vehicle.

In step S206, a quality estimation module 20 or an optical quality estimator 23 estimates optical quality data for the corresponding optical location data 28 for the first cell. The work area may be divided into a group of cells or coordinate ranges, where each cell or coordinate range is associated with an availability and or error of localization of the optical location-determining system 14 or the optical location data 28. Where the work area is divided into such cells or coordinate ranges, the quality estimating module 20 may retrieve or access optical quality data 34 for a corresponding first cell.

If the optical location determining system 14 comprises a vision-based triangulation system that comprises cameras (e.g., stationary cameras) mounted around a perimeter of a work area, the optical quality data may be calculated based on camera parameters (e.g., lens parameters, luminance sensitivity) and locations of the vehicle in the work area. Under one embodiment, the optical quality estimate is based on camera parameters and corresponding locations (e.g., in two or three dimensional coordinates) of one or more cameras associated with the work area.

In step S208, a data processor 38 selects at least one of the reception location data 26, the optical location data 28, or other data as refined location data 40 associated with the first cell based on the estimated reception quality data and the estimated optical quality data. The selection process of step S208 may be executed in accordance with various techniques, which may be applied separately or cumulatively. Under a first technique, the data processor 38, filter or switching matrix establishes relative weights for application of the reception location data 26 and the optical location data 28 based on the estimated reception quality data 32 and estimated optical quality data 34. Under the second technique, the data processor 38, filter or switching matrix selects comprises organizing the work area into a first zone where the reception location data 26 is selected exclusively as the refined location data 40. Under a third technique, the data processor 38, filter or switching matrix organizes the work area into a second zone where the optical location data 28 is selected exclusively as the refined location data 40. Under a fourth technique, the data processor 38, filter, or switching matrix organizes the work area into a third zone where both the reception location data 26 and the optical location data 28 is selected as the refined location data 40.

Under a fifth technique, the data processor 38, filter or switching matrix assigns each cell in the matrix one of a group of possible modes. Under a first mode, reception location data 26 is applied as the refined location data 40. Under a second mode, optical location data 28 is applied exclusively as the refined location data 40. Under a third mode, the dead-reckoning location data 30 is applied exclusively as the refined location data 40. Under a fourth mode, a combination of at least two of the reception location data 26, the optical location data 28, and the dead-reckoning location data 30 is applied as the refined location data 40.

Under a sixth technique, the data processor 38 may select other location data (e.g., odometer location data) where the reception quality data 32 falls below a first threshold and where the optical quality data 34 falls below a second threshold.

During or after step S208, the data processor 38 may define first cell with reference to the refined location data and store the first cell location, center point or boundaries in data storage device 39 along with the corresponding selection of refined location data for subsequent reference. Accordingly, if the vehicle traverses the first cell again, the data processor 38 may retrieve (from the data storage device 39) whether the optical location data, and the reception location data (or weighted optical location data and weighted reception location data) should be selected as refined location data for that particular first cell. If the vehicle traverses the entire work area, a map or matrix of vehicular cells versus selection of reception location data or optical location data (as refined location data) for the cells may be created for reference by the vehicle or another vehicle with substantially similar sensor suite of a location-determining receiver 12 and an optical location determining system 14. It should be noted that the reception quality module 20 may be removed for subsequent traversals of the vehicle over the work area, after the vehicle has prepared the map or matrix of vehicular cells versus selection of reception location data or optical location data. This may reduce the costs of hardware and weight for certain vehicular configurations.

Figure 3:
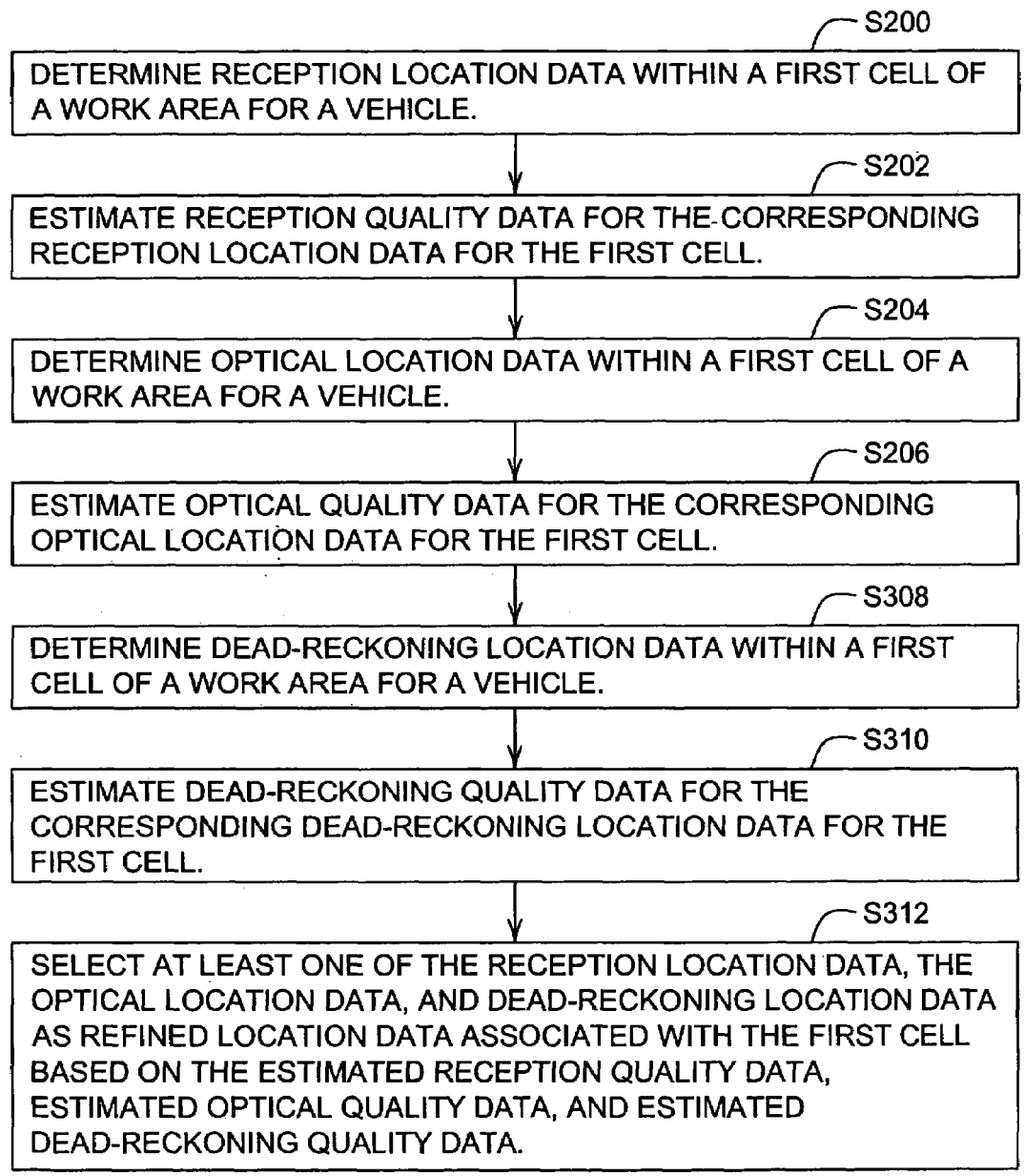
FIG. 3 is a flow chart of a second method for determining a location of a vehicle.

The method of FIG. 3 is similar to the method of FIG. 2, except the method of FIG. 3 deletes step S208 and adds steps S308, S310, and S312. Like reference numbers in FIG. 2 and FIG. 3 indicate like procedures or steps.

In step S308, a location-sensing system 10 or dead-reckoning system 16 determines dead-reckoning location data 30 within a first cell of a work area for a vehicle.

In step S310, a quality estimation module 20 or a dead-reckoning quality estimator 24 estimates dead-reckoning quality data 36 for the corresponding dead-reckoning location data 30 for the first cell. The work area may be divided into a group of cells or coordinate ranges, where each cell or coordinate range is associated with an availability, reliability, and or error of localization of the dead-reckoning system 16 or the dead-reckoning location data 30. Where the work area is divided into such cells or coordinate ranges, the odometer quality estimator 24 may retrieve or access dead-reckoning quality data 36 for a corresponding first cell. The dead-reckoning quality data 36 may consider error accumulation rates, where the dead-reckoning location data 30 is not used to supplement, augment or in conjunction with the reception location data 26 and the optical location data 28. In one example, where the work area is a baseball stadium, the dead-reckoning quality data 36 may be obtained from empirical measurement and may include different values for any of the following: dry grass, wet grass, dry artificial turf, wet artificial turf, outfield material, and infield dirt, infield sand or infield material. In another example, where the work area is a sports stadium, an arena, a soccer stadium, a football stadium, golf course, the dead-reckoning quality data 36 may be obtained from empirical measurement and may include different values for any of the following: dry grass, wet grass, dry artificial turf, wet artificial turf, golf rough, golf green, golf fairway, grass height, grass moisture, grass variety, and ground moisture. In another example, the dead-reckoning quality data 36 may be obtained from empirical measurements of a dry field, a wet field, a harvested field portion, an unharvested field portion, a plowed field portion, an unplowed field portion, a low-till portion, an exposed soil field, an unplanted field or the like.

In step S312, the data processor 38 selects at least one of the reception location data 26, the optical location data 28, and the dead-reckoning location data 30 as refined location data 40 associated with the first cell based on the estimated reception quality data 32, estimated optical quality data 34, and estimated dead-reckoning quality data 36. In one embodiment, the selecting process of step S312 is carried out by the data processor 38, filter or switching matrix establishing relative weights for application of the reception location data 26, the optical location data 28, and the dead-reckoning location data 30 based on the estimated reception quality data 32, estimated optical quality data 34, and estimated dead-reckoning quality data 36. For example, the relative weight of a location sensor is increased with a material increase in its corresponding quality and decreased with a material decrease in its corresponding quality. If the quality level of any location sensor falls below a minimum threshold, the weight may be reduced to eliminate its contribution to the location solution or refined location data 40.

During or after step S312, the data processor 38 may define first cell with reference to the refined location data and store the first cell location or boundaries in data storage 39 along with the corresponding selection of refined location data for subsequent reference. Accordingly, if the vehicle traverses the first cell again, the data processor 38 may retrieve whether the optical location data, the odometer location data, and the reception location data (or weighted optical location data, weighted odometer location data and weighted reception location data) should be selected as refined location data for that particular first cell. If the vehicle traverses the entire work area, a map or matrix of vehicular cells versus selection of reception location data or optical location data (as refined location data) for the cells may be created for reference by the vehicle or another vehicle with substantially similar sensor suite of a location-determining receiver 12 and an optical location determining system 14. It should be noted that the reception quality module 20 may be removed for subsequent traversals of the vehicle over the work area, after the vehicle has prepared the map or matrix of vehicular cells versus selection of reception location data or optical location data. This may reduce the costs of hardware and weight for certain vehicular configurations.

Figure 4:
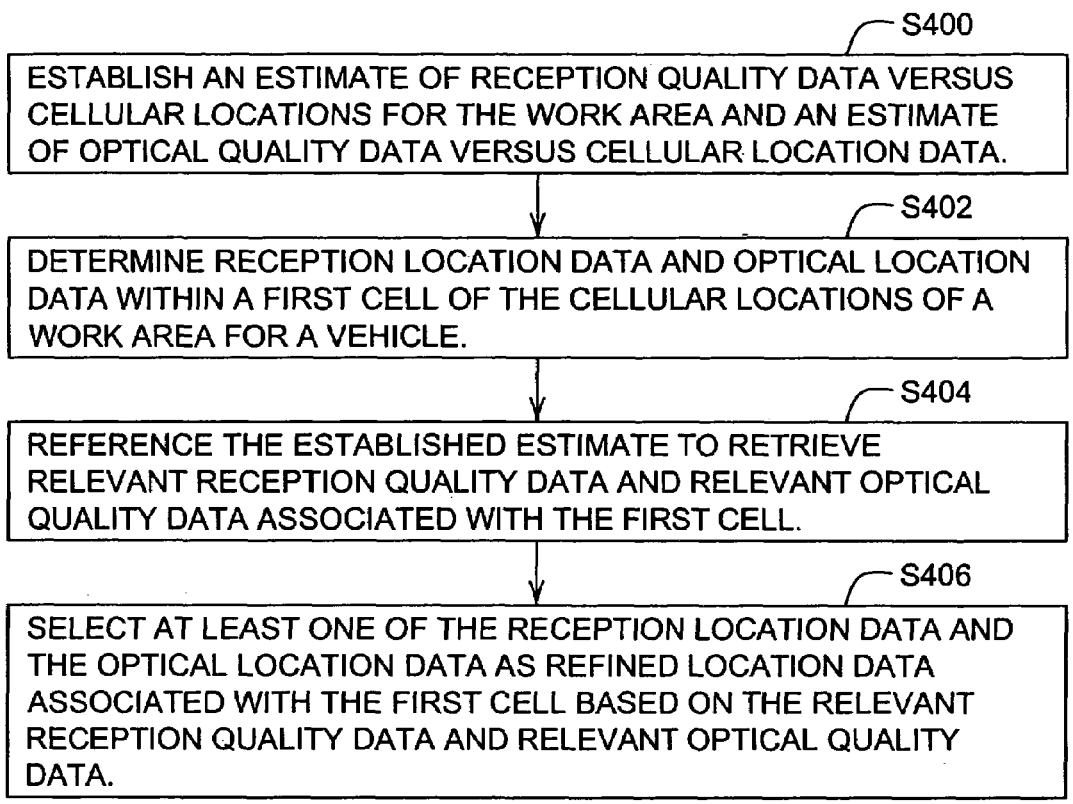
FIG. 4 is a flow chart of a third method for determining a location of a vehicle.

FIG. 4 discloses a method for determining a location of a vehicle based on site specific sensor quality data. The method of FIG. 4 begins in step S400.

In step S400, a quality estimation module 20 or user interface 18 establishes an estimate of reception quality data 32 versus cellular locations for work area and an estimate of optical quality data 34 versus cellular location data. Under a first approach for executing step S400, the quality estimation module 20 expresses the estimate as at least one of a map, a contour map, a two-dimensional matrix, and a multidimensional matrix, a look-up table, a chart, and a database. Under a second approach for executing step S400, the quality estimation module 20 expresses the estimate as a contour map having contours indicative of a dilution-of-precision (DOP) value associated with at least one of the reception location data 26 and the optical location data 28. The dilution of precision (DOP) value may comprise a Position Dilution of Precision, a Relative Dilution of Precision, a Horizontal Dilution of Precision, Vertical Dilution of Precision, Time Dilution of Precision, and Geometric Dilution of Precision.

In step S402, the location-sensing system 10 determines reception location data 26 and optical location data 28 within a first cell of the cellular locations of a work area for a vehicle.

In step S404, the quality estimation module 20 references the established estimate to retrieve relevant reception quality data and relevant optical quality data associated with the first cell.

In step S406, the data processor 38 selects at least one of the reception location data 26 and the optical location data 28 as refined location data 40 associated with the first cell based on the relevant reception quality data 32 and the relevant optical quality data 24. For example, in the selection process of step S406, the data processor 38 establishes relative weights for application of the reception location data 26 and the optical location data 28 based on the relevant reception quality data 32 and relevant optical quality data 34, respectively.

Figure 5:
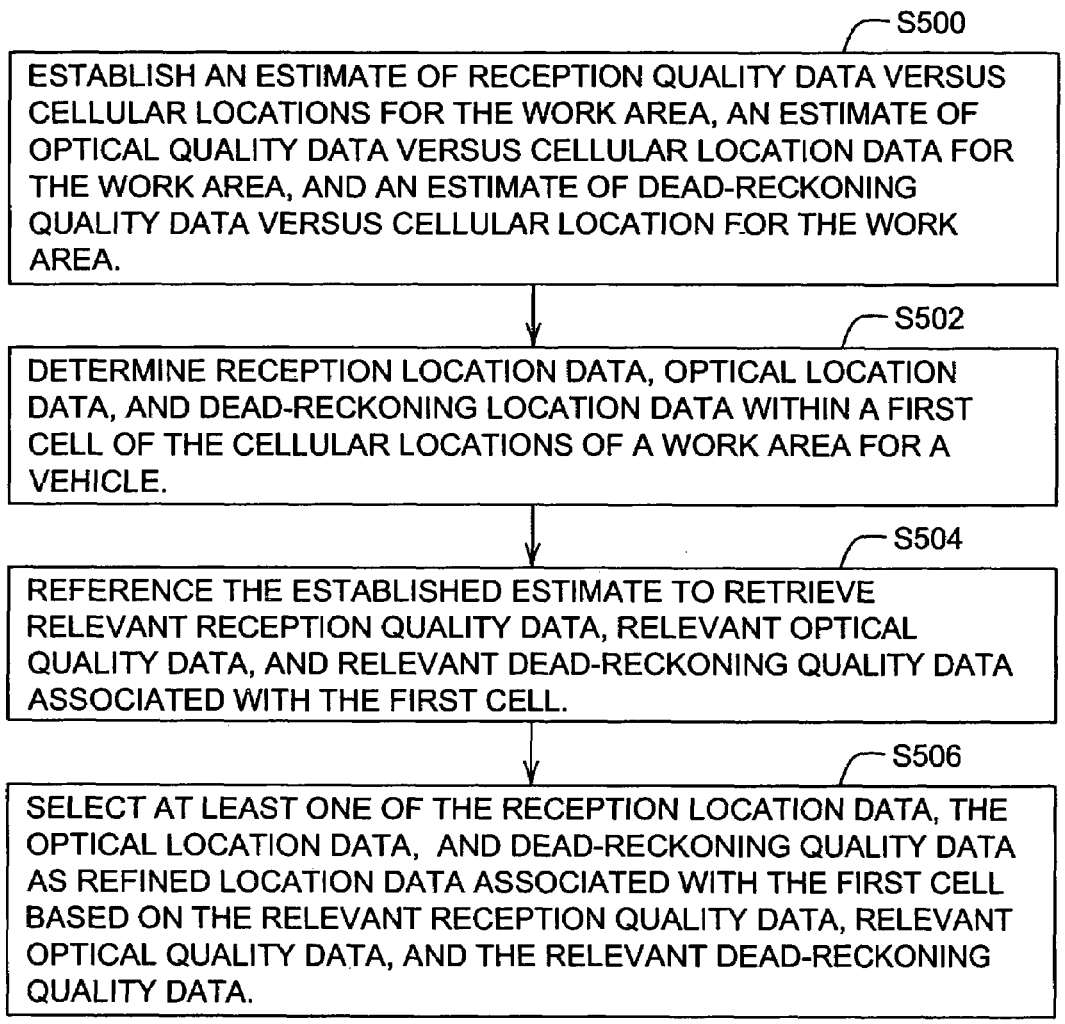
FIG. 5 is a flow chart of a fourth method for determining a location of a vehicle.

The method of FIG. 5 is similar to the method of FIG. 4, except the method of FIG. 5 further considers dead-reckoning location data 30 and dead-reckoning quality data 36. The method of FIG. 5 begins in step S500.

In step S500, the quality estimation module 20 or the user interface 18 establishes an estimate of reception quality data 32 versus cellular locations for work area; an estimate of optical quality data 34 versus cellular locations for the work area; and an estimate of dead-reckoning quality data 36 versus cellular locations for the work area.

In step S502, the location-sensing system 10 determines reception location data 26, optical location data 28, and dead-reckoning location data 30 within a first cell of the cellular locations of a work area for a vehicle.

In step S504, the quality estimation module 20 may reference the established estimate to retrieve relevant reception quality data 32, relevant optical quality data 34, and relevant dead-reckoning quality data 36 associated with the first cell.

In step S506, the data processor 38 selects at least one of the reception location data 26, the optical location data 28, and dead-reckoning location data 30 as refined location data 40 associated with the first cell based on the relevant reception quality data 32, relevant optical quality data 34, and the relevant dead-reckoning quality data 36. For example, in accordance with step S506, the data processor 38 establishes relative weights for application of the reception location data 26, the optical location data 28, and the dead-reckoning location data 30 based on the relevant reception quality data 32, relevant optical quality data 34, and relevant dead-reckoning quality data 36.

Figure 6:
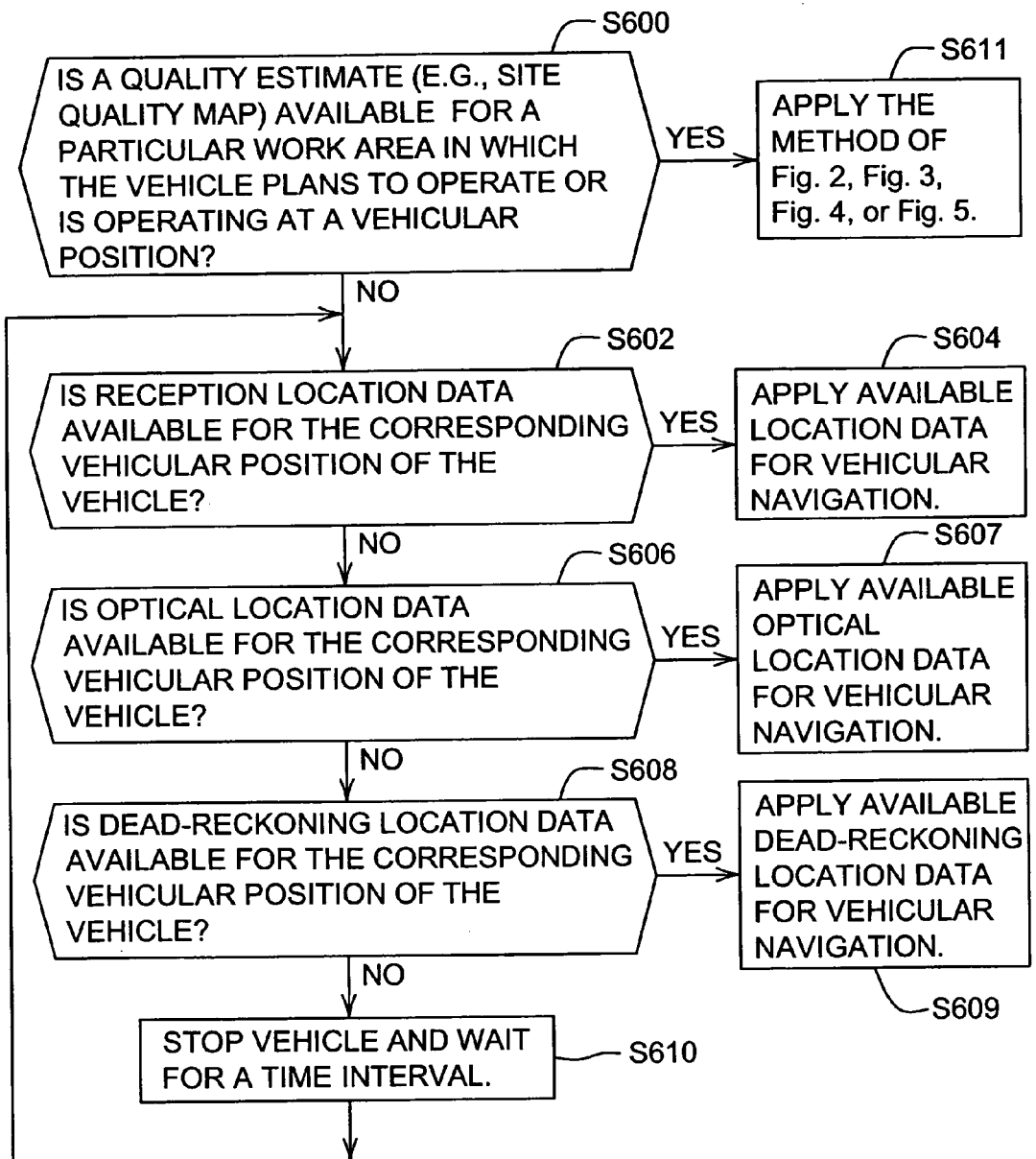
FIG. 6 is a flow chart of a method for navigation of a vehicle in accordance with a sensor hierarchy.

FIG. 6 is a flow chart of a method for navigation of a vehicle. The method of FIG. 6 applies a hierarchical approach to the selection of reception location data 26, optical location data 28, or dead-reckoning location data 30, as the refined location data 38. The method of FIG. 6 begins in step S600.

In step S600, a quality estimation module 20 or a data processor 38 determines whether a quality estimate (e.g., a site quality map) is available for a particular work area in which the vehicle plans to operate or is operating. The vehicle has a vehicular position. If the quality estimate is available, then the method continues with step S611. However, if the quality estimate is not available, then the method continues with step S602.

In step S611, the method of FIG. 6 applies the method of FIG. 2, FIG. 3, FIG. 4, or FIG. 5. For example, following step S611 the method may continue with step S200 of FIG. 2 or FIG. 3, step S400 of FIG. 4, or step S500 of FIG. 5.

In step S602, a quality estimation module 20 or location-sensing system 10 determines whether reception location data 26 is available or meets a Dilution of Precision (DOP) threshold criteria for the corresponding vehicular position of the vehicle. If the reception location data 26 is available or meets the DOP threshold criteria, the method continues with step S604. However, if the reception location data is not available or fails to meet the DOP threshold criteria, the method continues with step S606. The reception location data may be considered unavailable where the displacement reported by the location determining receiver 12 is physically "impossible" or inconsistent with reported displacements, considering the greater error of the available sources of reported displacements for a given corresponding time.

In step S604, the data processor 38 applies available reception location data for vehicular navigation.

In step S606, a quality estimation module 20 or location-sensing system 10 determines whether optical location data 28 is available, the estimated Dilution of Precision (DOP) meets a threshold DOP criteria, or the figure of merit meets or exceeds a threshold for the corresponding vehicular position of the vehicle. If the optical location data 28 is available, meets a threshold DOP criteria, or the figure of merit meets or exceeds a threshold, the method continues with step S607. However, if the optical location data 28 is not available, the method continues with step S608.

In step S607, the data processor 38 applies available optical location data 28 for vehicular navigation. The optical location data may be used to guide a vehicle with respect to visual landmarks (e.g., crop rows or plant rows in a field). An as-planted map where plants or portions thereof (e.g., trunks) have known locations, may be used to guide the vehicle.

In step S608, a quality estimation module 20 or location-sensing system 10 determines whether reception location data 26 is available or if the cumulative error (e.g., distance error integration estimate) is less than or equal to a maximum limit for the corresponding vehicular position of the vehicle. If the reception location data 26 is available or the cumulative error is less than or equal to the maximum limit, the method continues with step S609. However, if the reception location is not available or if the cumulative error (e.g., distance error integration estimate) is greater than the maximum limit, the method continues with step S610.

In step S609, the data processor 38 applies available dead-reckoning location data 30 for vehicular navigation.

In step S610, the vehicle is stopped and it waits for a time interval to continue with step S602 or otherwise. During the wait, for example, one or more satellite transmissions may improve the reception signal quality of the location determining receiver, such that the reception location data 26 becomes available or meets a Dilution of Precision (DOP), for example.

In an alternate example of step S610, a visual or audio alert system may alert an operator that the vehicle has switched to manual guidance mode or an operator guided mode.

Figure 7:
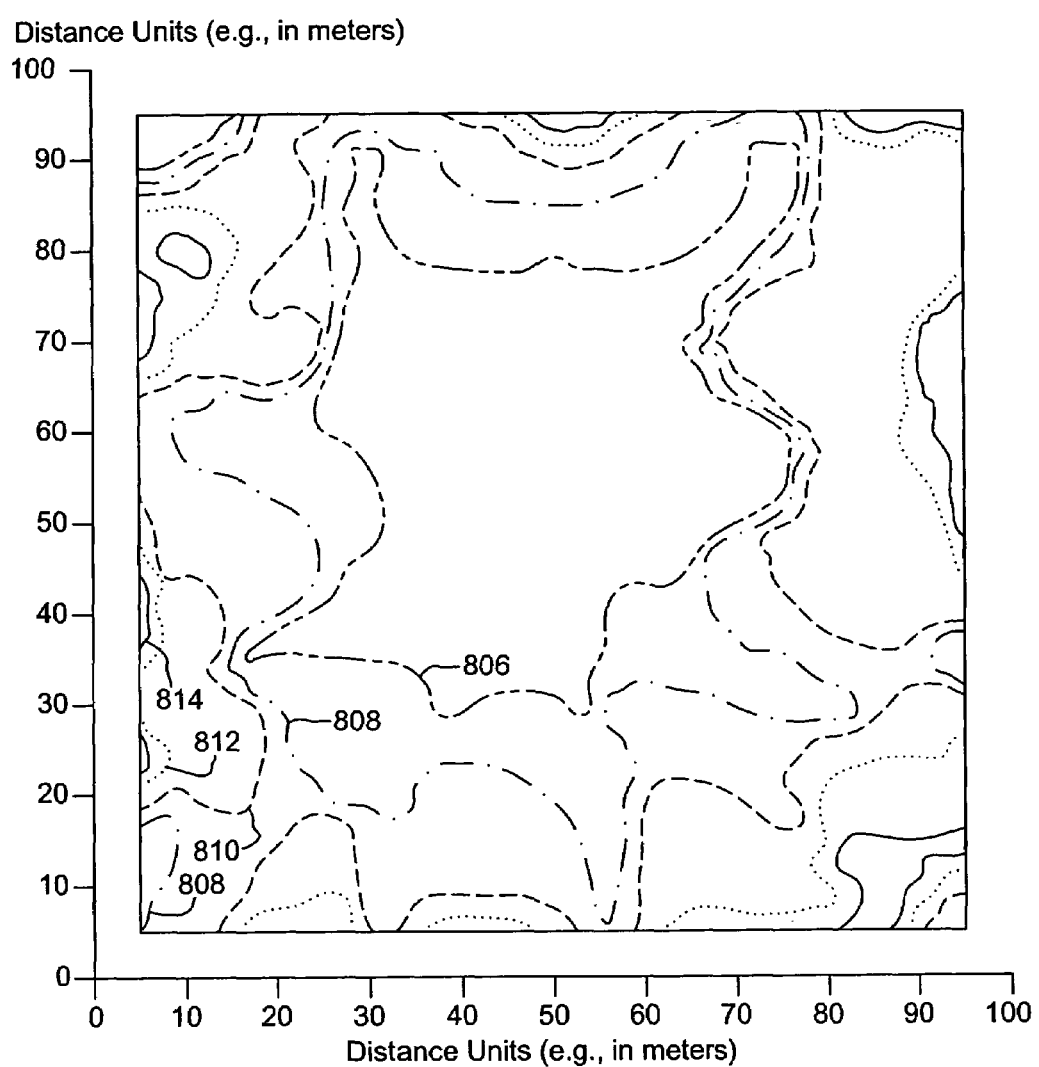
FIG. 7 is a map of error magnitude contours of one or more location sensing devices in a work area.

FIG. 7 is a map of error magnitude contours of one or more location sensors or location sensing devices in a work area. Each contour represents a constant error level or a uniform error level range for one or more of the following data measurements for location of the vehicle: reception location data 26, optical location data 28, and dead-reckoning location data 30. The first contour 806 is illustrated as a series of two adjacent dashes that interrupt a solid curved line. The second contour 808 is illustrated as alternating dots and dashes. The third contour 810 is illustrated as a dashed line. The fourth contour 812 is illustrated as a dotted line. The fifth contour 814 is illustrated as a solid line. Although the first contour 806 is associated with a highest level of error here for illustrative purposes and the fifth contour 814 is associated with a lowest level of error here, each contour may be assigned virtually any error level and fall within the scope of the invention.

Although the units on the horizontal and vertical axes, are shown in meters, any suitable measurement of spatial or distance dimensions may be used in practice.

In one example, the reception location may have a first error magnitude contour similar to that of FIG. 7; the optical location data 28 may have a second error magnitude contour that differs from that of FIG. 7, and the dead-reckoning location data 30 may have a third error magnitude contour that is independent or differs from those of the first error magnitude contour and the second error magnitude contour. Although the error magnitude contour is shown as contours (806, 808, 810, 812, and 814) in FIG. 7, in an alternate embodiment the contours may be represented by an illustrative chart, database, tabular data points, geometric equations, line equations, curve equations, or otherwise.

Figure 8:
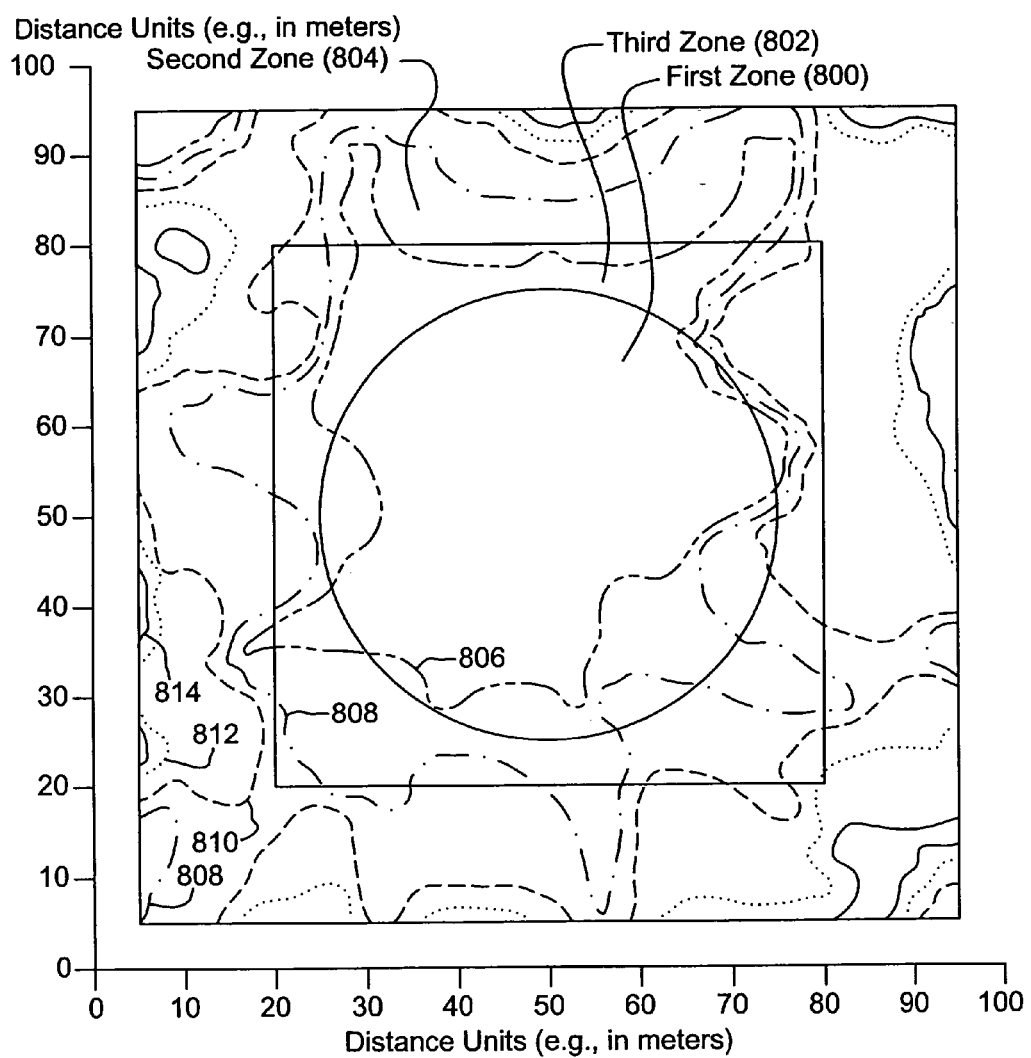
FIG. 8 is a map of navigation modes associated with particular corresponding zones of the work area of FIG. 7.

FIG. 8 is a map of navigation modes associated with particular corresponding zones of the work area. The map of FIG. 8 is similar to the map of FIG. 7 except in the map of FIG. 8: (1) the contours (806, 808, 810, 812 and 814) definitely represent error level or uniform error range for optical location data and (2) a group of zones (800, 802, and 804) for corresponding navigational modes are shown. Each zone (800, 802, or 804) represents an area where a different location sensor or combination of sensors is preferred based on at least one of an error magnitude contour for optical location data, odometer location data, and reception location data. For example, a first zone 800 may be associated with the location-determining receiver 12 and the reception location data 26 as the preferential location sensor and the preferential location data, respectively. In the first zone 800, the location-determining receiver 12 provides acceptable error or reliability and the vision data does not.

A second zone 804 may be associated with an optical location-determining system 14 and the optical location data 28 as the preferential location sensing subsystem and the preferential location data, respectively. In the second zone 804, the optical location data 28 is acceptable and the reception location data 26 is not.

A third zone 802 may be associated with a dead-reckoning system 16 and the dead-reckoning location data 30 as the preferential location sensing subsystem and the preferential dead-reckoning location data 30, respectively. In a third zone 802, neither the reception location data 26, nor the optical location data 28 provides acceptable error, availability or reliability.

Although the first zone 800 is generally elliptical; the third zone 802 forms an elliptical and rectangular inner frame; the second zone 804 forms a generally rectangular outer frame, other shapes of the zones are possible and fall within the scope of the claimed invention. The vehicle may use a map (e.g., the map of FIG. 8) or an equivalent data representation thereof to switch between the reception location data 26, the optical location data 28, and the dead-reckoning location data 30 for derivation of the refined location data 40 for guidance or path planning of the vehicle. Alternatively, the vehicle may use a map or an equivalent data representation thereof to apply different weights to the reception location data 26, the optical location data 28, and the dead-reckoning location data 30 for derivation of the refined location data 40. Accordingly, rather than using an on-off use of each sensor, the weighting may be accomplished by application of a Kalman filter to provide a smoother sequence of calculated positions while avoiding discontinuities that might otherwise occur when shifting from one zone to an adjacent zone.

Figure 9:
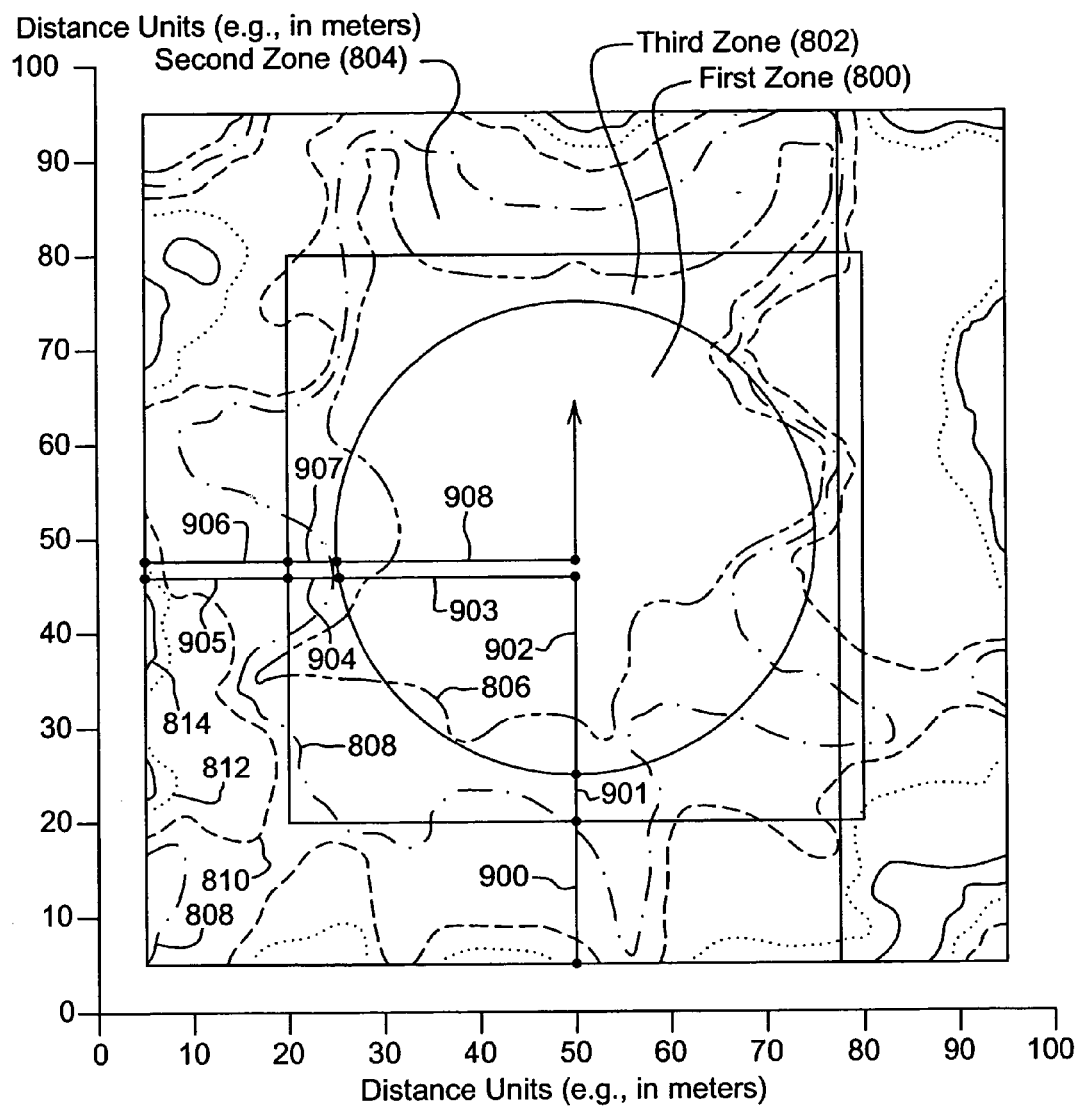
FIG. 9 is a map of an illustrative vehicular path that traverses navigation modes of the work area.

FIG. 9 is another map of navigation modes associated with particular corresponding zones of the work area. The map of FIG. 9 is similar to the map of FIG. 8 except the map of FIG. 9 shows a path plan of the vehicle. Like reference numbers indicate like elements in FIG. 7, FIG. 8 and FIG. 9.

The path plan of the vehicle is shown as several generally linear segments (900, 901, 902, 903, 904, 905, 906, 907, and 908). The path plan may be divided into a series of segments based on the intersection of the path plan with various zones of preferential location data, the turns in the path plan, or both. At the intersection of the path plan with various zones, the intersections are shown as points for clarity.

Starting from a first path plan segment 900 on a right side of the map of FIG. 9, the vehicle would be in a second zone 804 so that the optical location data 28 would be the preferential location data. In the second path segment 901, the vehicle would be in the third zone 802 such that the dead-reckoning location data 30 may be the preferential location data. This second path segment 901 may be susceptible to inaccuracy to cumulative error of the dead-reckoning system 16, unless appropriate path diversions or reroutes are taken as described below. In the third path segment 902 and fourth path segment 903, the vehicle would be in the first zone 800 such that the reception location data 26 (e.g., GPS data) would apply. In the fifth path segment 904, the vehicle would be in the third zone 802 such that the dead-reckoning location data 30 may be the preferential location data. In the sixth path segment 905 and the seventh path segment 906, the vehicle would be in the second zone 804 such that the optical location data 28 may be the preferential location data. In the eighth path segment 907, the vehicle would be in the third zone 802 such that the odometer location data 30 would apply. In the ninth path segment 908, the vehicle would be in the first zone 800 such that the reception location data 26 would apply.

The path planning module 42 may alter the path plan (e.g., second path segment 901) to compensate for the errors that might otherwise accumulate in guidance or navigation of the vehicle. If the vehicle (e.g., a mower) uses strictly back-and forth motion vertically or horizontally in generally parallel rows to cover a work area shown in FIG. 8, there will be several general areas where the vehicle may spend extensive amounts of time (e.g., in the third zone 802, depending on its geometric shape) where neither optical location data 28, nor reception location data 26 is available to compensate for the cumulative error of the dead-reckoning location data 30. Accordingly, prior to the dead-reckoning quality data 36 exceeding a threshold cumulative error or exceeding a threshold maximum time in the third zone 802, the path plan of the vehicle may be modified to enter into another zone (e.g., first zone 800 or the second zone 804) where reception location data 26 or optical location data 28 is available to truth or augment the dead-reckoning location data 30. Accordingly, path plans that change from one zone to another zone on a regular basis or prior to the elapse of a maximum time period may offer greater diversity of sensor type of the location-sensing system 10 and increased reliability.

For path planning purposes, the path planning module 42 may use the calculated position error information, the reception quality data, the optical quality data, or the dead-reckoning quality data 36 as a coverage overlap or adjacent row overlap allowance. If the calculated maximum error is approximately 10 centimeters, then the vehicle (e.g., mower) could overlap the adjacent pass or row by approximately 10 centimeters to ensure the vegetation is properly processed (e.g. mowed) or the treatment or crop input is properly disbursed. The maximum error for a pass could be used for the entire pass and then adjusted for the maximum error of the next path. If the optical location-determining system 14 has pan, tilt or zoom rate limits, the pat planner can generate path plans that do not require the camera rate limits to be exceeded.

The method and system of vehicular navigation may be applied to residential, golf course, and other mowers where Global Positioning System (GPS) signals may be blocked or attenuated by trees, buildings, or ground; timber harvesters and forwarders that occasionally or periodically visit clearings (in a forested or wooded area), but otherwise work in areas where GPS signals are blocked by trees or terrain; farm machinery operating a field or farm yard where GPS signals may be blocked by buildings, trees or terrain; and construction and military equipment where GPS signals may be blocked by trees, buildings, or terrain, and many other types of vehicles and equipment.

Figure 10:
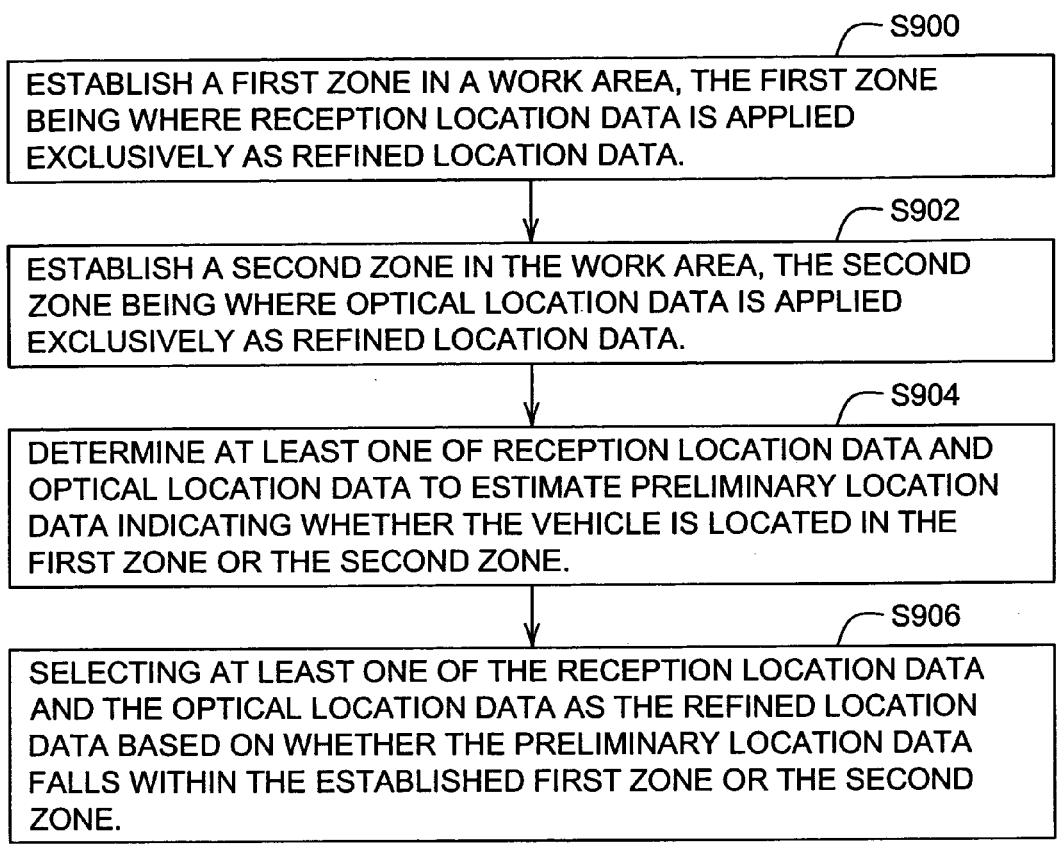
FIG. 10 is a flow chart of another method for determining a location of a vehicle.

FIG. 10 is a flow chart of a method for determining a location of a vehicle in accordance with predetermined zones in a work area. The predetermined zones may be established before the vehicle performs a task in the work area or traverses the work area to perform a function. The method of FIG. 10 begins with step S900.

In step S900, a first zone is established in a work area. For example, a user may define a first zone based on a survey or map (e.g., error magnitude contour of FIG. 7) of reception quality data in the work area via user interface 18 and quality estimation module 20. The first zone is where reception location data is applied preferentially or exclusively as refined location data. In the first zone, the reception location data is associated with a corresponding reception quality data that meets or exceeds a certain minimum threshold of reliability within the first zone. Although the optical location data and the odometer location in the first zone may be unreliable or may vary too much to be uniformly reliable over the first zone, in one example the reception location data may still be used for the first zone even where the optical location data, the odometer location data, or both tend to be reliable within material areas of the first zone.

In one embodiment, the first zone may be defined by an outer perimeter, an inner perimeter or both. A series of points (e.g., two or three dimensional coordinates) may be defined on the outer perimeter and the inner perimeter, and stored in a storage device 39 associated with the data processor 38.

In another embodiment, the first zone comprises a series of cells in the work area. It is possible that at least some of the cells of the first zone are noncontiguous. The cells may have a uniform size and shape (e.g., polygonal). Each cell may be associated with its central coordinates, a range of coordinates, or its perimeter coordinates.

In step S902, a second zone is established in a work area. For example, a user may define a second zone based on a survey or map (e.g., error magnitude contour of FIG. 7) of optical quality data in the work area via user interface 18 and quality estimation module 20. The second zone is where optical location data is applied preferentially or exclusively as refined location data. In the second zone, the optical location data is associated with a corresponding optical quality data that meets or exceeds a certain minimum threshold of reliability within the second zone. Although the reception location data and the odometer location in the second zone may be unreliable or may vary too much to be uniformly reliable over the second zone, in one example the optical location data may still be used for the second zone even where the reception location data, the odometer location data, or both tend to be reliable within material areas of the second zone.

In one embodiment, the second zone may be defined by an outer perimeter, an inner perimeter or both. A series of points (e.g., two or three dimensional coordinates) may be defined on the outer perimeter and the inner perimeter, and stored in a storage device 39 associated with the data processor 38.

In another embodiment, the second zone comprises a series of cells in the work area. It is possible that at least some of the cells of the second zone are noncontiguous. The cells may have a uniform size and shape (e.g., polygonal). Each cell may be associated with its central coordinates, a range of coordinates, or its perimeter coordinates.

In step S904, the location-determining receiver 12 determines the reception location data and the optical location-determining receiver 14 determines optical location data to estimate preliminary location data indicating whether the vehicle is located in the first zone or the second zone. It should be noted at this point in time in step S904, the exact position of the vehicle with absolute precision or certainty is not known because there may be error associated with the reception location data and optical location data. The preliminary location data may be derived from the reception location data, the optical location data, or both.

The preliminary location data may be determined in accordance with the following techniques, which may be applied individually or cumulatively. Under a first technique, the preliminary location data comprises the reception location data or the optical location data, if the reception location data and the optical location data are coextensive or spaced apart by a maximum tolerance (e.g., a maximum specified distance).

Under a second technique, the preliminary location data comprises the geometric mean or average of the reception location data and the optical location data, if the reception location data and the optical location data are coextensive or spaced apart by a maximum tolerance. For instance, a line segment interconnects the coordinates of the reception location data and the optical location data, and the geometric mean or average is located on the line segment one-half of the distance between the coordinates or ends of the line segment.

Under a third technique, the preliminary location data comprises the weighted geometric mean or weighted average of the reception location data and the optical location data, if the reception location data and the optical location data are coextensive or spaced apart by a maximum tolerance. For instance, a line segment interconnects the coordinates of the reception location data and the optical location data, and the weighted geometric mean or weighted average is located on the line segment on some distance (which is proportional to the weights assigned to the reception location data and optical location data) between the coordinates or ends of the line segment.

Under a fourth technique, the preliminary location data comprises the reception location data, if the reception location data is available or meets or exceeds a threshold level of reliability. Under a fifth technique, the preliminary location data comprises the optical location data, if the reception location data is not available or if the reception location data falls below a threshold level of reliability.

In step S906, a data processor 38 or selector selects at least one of the reception location data and the optical location as the refined location data based on whether the preliminary location data falls within the established first zone or the second zone. The selection process of step S906 may determine how to select the refined location data where the estimated preliminary data is inconclusive or suspect in reliability in accordance with various procedures, which may be applied alternately or cumulatively. Under a first procedure, if the estimated preliminary location data is inconclusive with respect to whether the vehicle is located in the first zone, the second zone, the data processor or selector selects the reception location data as the refined location data. Under a second procedure if the estimated preliminary data is inconclusive with respect to whether the vehicle is located in the first zone or second zone and if the reception location data is not available, the data processor or selector selects the optical location data as the refined location data. Under a third procedure, if the estimated preliminary data is inconclusive with respect to whether the vehicle is located in the first zone or the second zone and if the reception location data falls below a threshold reliability level, the data processor 38 or selector selects the optical location data as the refined location data. Under a fourth procedure, if the estimated preliminary data is inconclusive with respect to whether the vehicle is located in the first zone or the second zone, the data processor 38 or selector may select or default to the last selected type of location data for the last verifiable zone in which the vehicle was present, unless more than a maximum threshold time has elapsed.

In considering practical implementation of the method of FIG. 10, the cumulative error of the vehicle relying on any one of the optical location data, the odometer location data, and the reception location data for an excessive time or over an excessive distance without cross-checking against diverse location data may lead to guidance errors or drift. Accordingly, where the method of FIG. 10 is used to execute a path plan, one or more of the following limitations may be placed on over-reliance on any one of the location-determining receiver 12, the optical location-determining system 14, and the dead-reckoning system 16. Under a first illustrative limitation, a path planning module 42 executes or determines a path plan of the vehicle such that the vehicle switches between the first zone and the second zone within a certain maximum time limit. Under a second illustrative limitation, a path planning module 42 executes or determines a path plan of the vehicle such that the vehicle switches between the first zone and the second zone within a certain maximum distance traversed by the vehicle.

Figure 11:
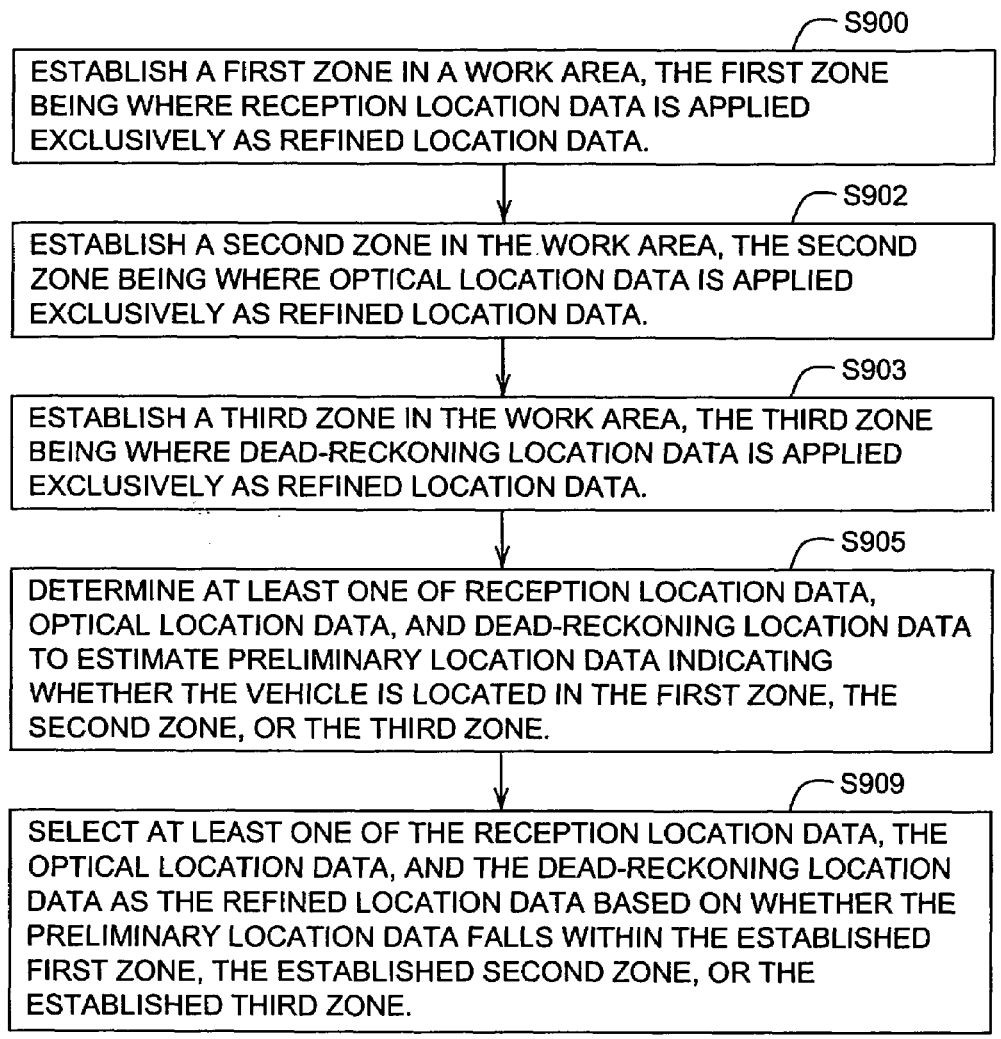
FIG. 11 is a flow chart of yet another method for determining a location of a vehicle.

The method of FIG. 11 is similar to the method of FIG. 10, except the method of FIG. 11 is expanded to include a third zone and odometer location data. Like reference numbers in FIG. 10 and FIG. 11 indicate like steps or procedures.

After step S900 and step S902, the method continues with step S903. In step S903, a third zone is established in a work area. For example, a user may define a third zone based on a survey or map (e.g., error magnitude contour of FIG. 7) of optical quality data in the work area via user interface 18 and the quality estimation module 20. The third zone is where odometer location data is applied preferentially or exclusively as refined location data. In the third zone, the odometer location data is associated with a corresponding dead-reckoning quality data 36 that meets or exceeds a certain minimum threshold of reliability within the third zone.

Although the reception location data and the optical location data in the third zone may be unreliable or may vary too much to be uniformly reliable over the third zone, in one example the odometer location data may still be used for the third zone even where the reception location data, the optical location data, or both tend to be reliable within material areas of the third zone.

In one embodiment, the third zone may be defined by an outer perimeter, an inner perimeter or both. A series of points (e.g., two or three dimensional coordinates) may be defined on the outer perimeter and the inner perimeter, and stored in a storage device 39 associated with the data processor 38.

In another embodiment, the third zone comprises a series of cells in the work area. It is possible that at least some of the cells of the third zone are noncontinguous. The cells may have a uniform size and shape (e.g., polygonal). Each cell may be associated with its central coordinates, a range of coordinates, or its perimeter coordinates.

In step S905, at least one of reception location data, optical location data, and odometer location data is determined to estimate preliminary location data. The preliminary location data indicates whether the vehicle is located in the first zone, the second zone or the third zone.

It should be noted at this point in time in step S905, the exact position of the vehicle with absolute precision or certainty is not known because there may be error associated with the reception location data, the optical location data, and the odometer location data. The preliminary location data may be derived from the reception location data, the optical location data, odometer location data, or any combination of the foregoing location data.

The preliminary location data may be determined in accordance with the following techniques, which may be applied individually or cumulatively. Under a first technique, the preliminary location data comprises the reception location data, the optical location data, or the odometer location data if the reception location data, the optical location data, and the odometer location data are coextensive or spaced apart by a maximum tolerance (e.g., a maximum specified distance) with respect to each other.

Under a second technique, the preliminary location data comprises the geometric mean or average of the closest two of the reception location data, the optical location data, and the odometer location data, if the reception location data, the optical location data, and the odometer are coextensive or spaced apart with respect to each other by a maximum tolerance. For instance, a line segment interconnects the coordinates of the closest two of the reception location data, the optical location data, and the odometer location data; and the geometric mean or average is located on the line segment one-half of the distance between the coordinates or ends of the line segment extending between the closest two.

Under a third technique, the preliminary location data comprises the weighted geometric mean or weighted average of the reception location data, the optical location data, and the odometer location data if the reception location data, the optical location data, and the odometer location data are coextensive or spaced apart by a maximum tolerance. For instance, a line segment interconnects the coordinates of the closest two of the reception location data, the optical location data, and the odometer location data, and the weighted geometric mean or weighted average is located on the line segment on some distance (which is proportional to the weights assigned to the reception location data and optical location data) between the coordinates or ends of the line segment extending between the closest two.

Under a fourth technique, the preliminary location data comprises the reception location data, if the reception location data is available or meets or exceeds a threshold level of reliability. Under a fifth technique, the preliminary location data comprises the optical location data, if the reception location data is not available or if the reception location data falls below a threshold level of reliability.

In step S909, the data processor 38 or selector selects at least one of the reception location data, the optical location data, and the odometer location data as the refined location data based on whether the preliminary location data falls within the established first zone, the established second zone or the established third zone.

In considering practical implementation of the method of FIG. 11, the cumulative error of the vehicle relying on any one of the optical location data, the odometer location data, and the reception location data for an excessive time or over an excessive distance without cross-checking against diverse location data (other location data available from the location sensing system 10) may lead to guidance errors or drift. Accordingly, where the method of FIG. 11 is used to execute a path plan, one or more of the following limitations may be placed on over-reliance on any one of the location-determining receiver 12, the optical location-determining system 14, and the dead-reckoning system 16. Under a first illustrative limitation, a path planning module 42 executes or determines a path plan of the vehicle such that the vehicle switches between the first zone and the second zone within a certain maximum time limit. Under a second illustrative limitation, a path planning module 42 executes or determines a path plan of the vehicle such that the vehicle switches between the first zone and the second zone within a certain maximum distance traversed by the vehicle.

Having described the preferred embodiment, it will become apparent that various modifications can be made without departing from the scope of the invention as defined in the accompanying claims.

What is claimed is:

1. A method for determining a location of a vehicle, the method comprising:

establishing a first zone in a work area, the first zone being where reception location data is applied exclusively as refined location data, a location determining receiver providing the reception location data from reception of electromagnetic energy transmitted from terrestrial or satellite beacons;

establishing a second zone in the work area, the second zone being where optical location data is applied exclusively as refitted location data;

determining at least one of reception location data and optical location data to estimate preliminary location data indicating whether the vehicle is located in the first zone or the second zone; and selecting one of the reception location data and the optical location data as the refined location data based on whether the preliminary indication data indicates that the vehicle falls within the established first zone or the second zone, respectively; where the optical location data is selected as the refined location data if the estimated preliminary data is inconclusive with respect to the first zone and second zone and if the reception location data falls below a threshold reliability level.

2. The method according to claim 1 wherein the first zone and the second zone comprise a series of cells in the work area.

3. The method according to claim 2 wherein at least some of the cells are noncontinguous.

4. The method according to claim 1 wherein selecting comprises selecting the optical location data if the estimated preliminary data is inconclusive with respect to the first zone and second zone and if the reception location data is not available.

5. The method according to claim 1 further comprising planning a path of vehicle such that the vehicle switches between the first zone and the second zone within a certain maximum time limit.

6. The method according to claim 1 further comprising planning a path of vehicle such that the vehicle switches between the first zone and the second zone within a certain maximum diatanoe traversed by the vehicle.

7. A method for determining a location of a vehicle, the method comprising:

establishing a first zone in a work area, the first zone being where reception location data is applied exclusively as refined location data, a location determining receiver providing the reception location data from reception of electromagnetic energy transmitted from terrestrial or satellite beacons;

establishing a second zone in the work area, the second zone being where optical location data is applied exclusively as refined location data;

establishing a third zone in a the work area, the third zone being where dead-reckoning location data is applied exclusively as refined location data;

determining at least one of reception location data, optical location data, and dead-reckoning location data to estimate preliminary location data indicating whether the vehicle is located in the first zone, the second zone, or the third tone; and selecting at least one of the reception location data, the optical location data, and dead-reckoning location data as the refined location data based on whether the preliminary indication data indicates that the vehicle falls within the established first zone, the established second zone, or the established third zone, respectively; where the dead-reckoning location data is selected as the refined location data if the estimated preliminary data is inconclusive with respect to the first zone, the second zone, and the third zone and if the reception location data is not available and if the optical location data is not available.

8. The method according to claim 7 wherein the first zone, the second zone, and the third zone comprise a series of cells in the work area.

9. The method according to claim 8 wherein at least some of the cells are noncontinguous.

10. The method according to claim 7 wherein selecting comprises selecting the optical location data if the estimated preliminary data is inconclusive with respect to the first zone, the second zone, and the third zone and if the reception location data falls below a threshold reliability level.

11. The method according to claim 7 wherein selecting comprises selecting the dead-reckoning location data if the estimated preliminary data is inconclusive with respect to the first zone, the second zone, and the third zone and if the reception location data is not available and if the optical location data falls below a threshold reliability level.

12. The method according to claim 7 further comprising planning a path of vehicle such that the vehicle switches between the third zone and at least one of the first zone and second zone within a certain maximum time limit.

13. The method according to claim 7 further comprising planning a path of vehicle such that the vehicle switches between the third zone and at least one of the first zone and the second lone within a certain maximum distance traversed by the vehicle.

14. A system for determining a location of a vehicle, the system comprising:

a reception quality estimator for establishing a first zone in a work area, the first zone being where reception location data is applied exclusively as refined location data;

an optical quality estimator for establishing a second zone in the work area, the second zone being where optical location data is applied exclusively as refined location data;

a dead-reckoning auality estimated for establishing a third zone in the work area, the third zone being where dead-reckoning location data is applied exclusively as refined location data:

a location-sensing system for determining at least one of reception location data, optical location data, and dead-reckoning location data to estimate preliminary location data indicating whether the vehicle is located in the first zone, the second zone or the third zone; the location-sensing system comprising a location determining receiver for providing the reception location data from reception of electromagnetic energy transmitted from terrestrial or satellite beacons; and a data processor for selecting at least one of the reception location data, the optical location data, and dead-reckoning location data as refined location data based on whether the preliminary indication data indicates that the vehicle falls within the first zone, the second zone, or the third zone, respectively.

15. The system according to claim 14 wherein the data processor is arranged to select the optical location data if the estimated preliminary data is inconclusive with respect to the first zone, the second zone, and the third zone and if the reception location data is not available.

16. The system according to claim 14 wherein data processor is arranged to select the dead-reckoning location data if the estimated preliminary data is inconclusive with respect to the first zone, the second zone, and the third zone and if the reception location data is not available and if the optical location data is not available.

* * * * *